United States Patent [19]

Kinoshita et al.

[11] 4,425,646
[45] Jan. 10, 1984

[54] INPUT DATA SYNCHRONIZING CIRCUIT

[75] Inventors: Kiyoshi Kinoshita; Takatoshi Ishii, both of Ome, Japan

[73] Assignee: Tokyo Shibaura Denki Kabushiki Kaisha, Kawasaki, Japan

[21] Appl. No.: 281,492

[22] Filed: Jul. 8, 1981

[30] Foreign Application Priority Data

Jul. 11, 1980 [JP] Japan .................................. 55-93957

[51] Int. Cl.³ ............................................. H03L 7/00
[52] U.S. Cl. ...................................... 371/61; 360/51; 375/118
[58] Field of Search ...................... 371/61; 360/51, 45; 375/118, 119, 120

[56] References Cited

U.S. PATENT DOCUMENTS

| | | | |
|---|---|---|---|
| 3,810,234 | 5/1974 | Monett | 360/51 |
| 4,215,430 | 7/1980 | Johnson, Jr. | 375/120 |
| 4,245,264 | 1/1981 | Allen | 360/51 |
| 4,270,183 | 5/1981 | Robinson et al. | 360/51 |
| 4,281,356 | 7/1981 | Sousa | 360/45 |
| 4,357,707 | 11/1982 | Delury | 375/119 |
| 4,365,210 | 12/1982 | Harrington et al. | 360/51 |

FOREIGN PATENT DOCUMENTS

| | | |
|---|---|---|
| 1279026 | 7/1972 | United Kingdom . |
| 1301598 | 9/1973 | United Kingdom . |
| 1327001 | 10/1973 | United Kingdom . |
| 1406924 | 9/1975 | United Kingdom . |
| 1452559 | 12/1976 | United Kingdom . |

Primary Examiner—Charles E. Atkinson
Attorney, Agent, or Firm—Cushman, Darby & Cushman

[57] ABSTRACT

An input data synchronizing circuit of the invention has a synchronous control counter. Part of count value of the synchronous control counter is supplied to a count register. The count register accesses a parameter ROM utilizing, as part of an address, a count value (phase status) during the input of current data and a count value (phase status) during input of immediately preceding data. The parameter ROM outputs a correction value as an initial value for the synchronous control counter so that the synchronous control counter would output a WINDOW signal synchronous with the input data near the center of the pulse width of the WINDOW signal. The circuit of the invention further includes a rotation correction register which holds stationary time shift information serially input by the rotational errors of the floppy disk drives and which outputs the information to the parameter ROM as part of the address.

4 Claims, 59 Drawing Figures

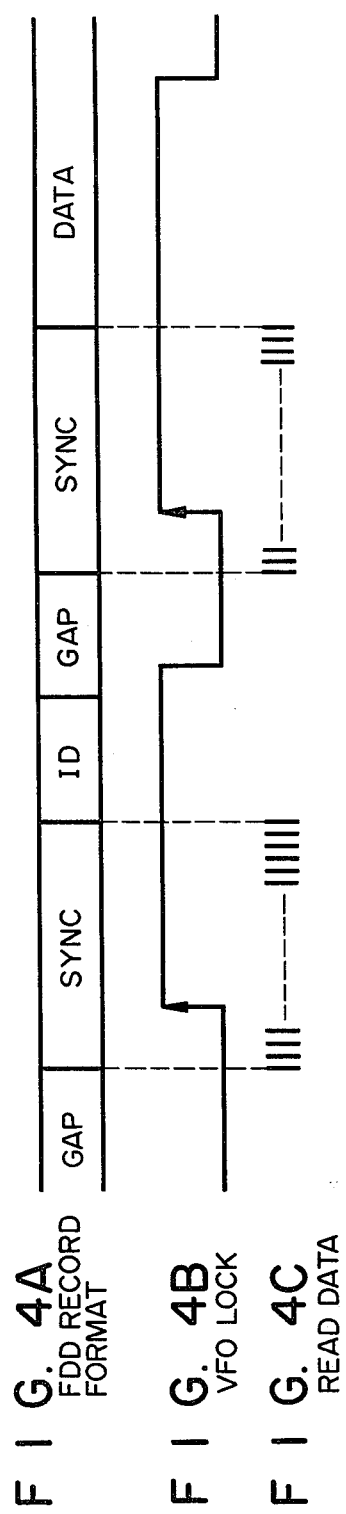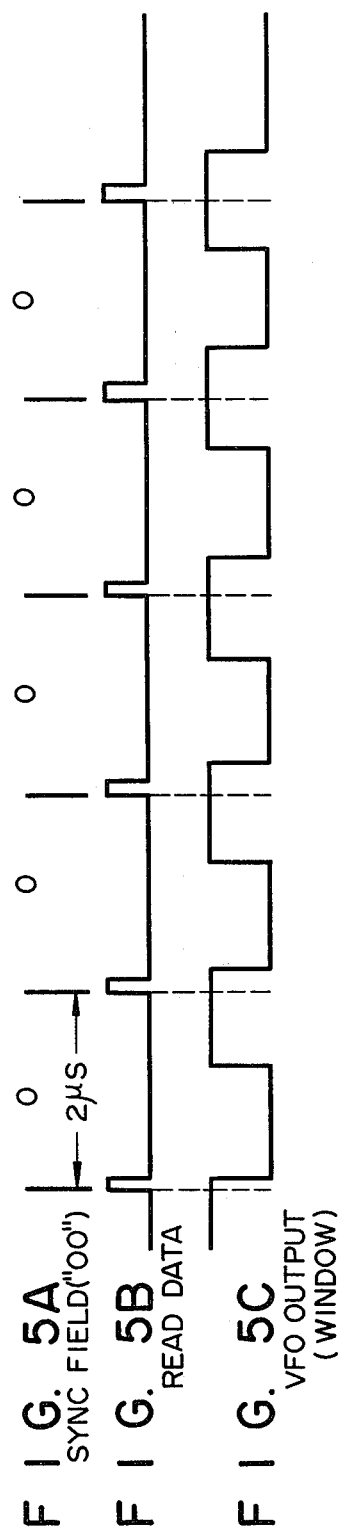
FIG. 4A FDD RECORD FORMAT
FIG. 4B VFO LOCK
FIG. 4C READ DATA
FIG. 5A SYNC FIELD ("00")
FIG. 5B READ DATA
FIG. 5C VFO OUTPUT (WINDOW)

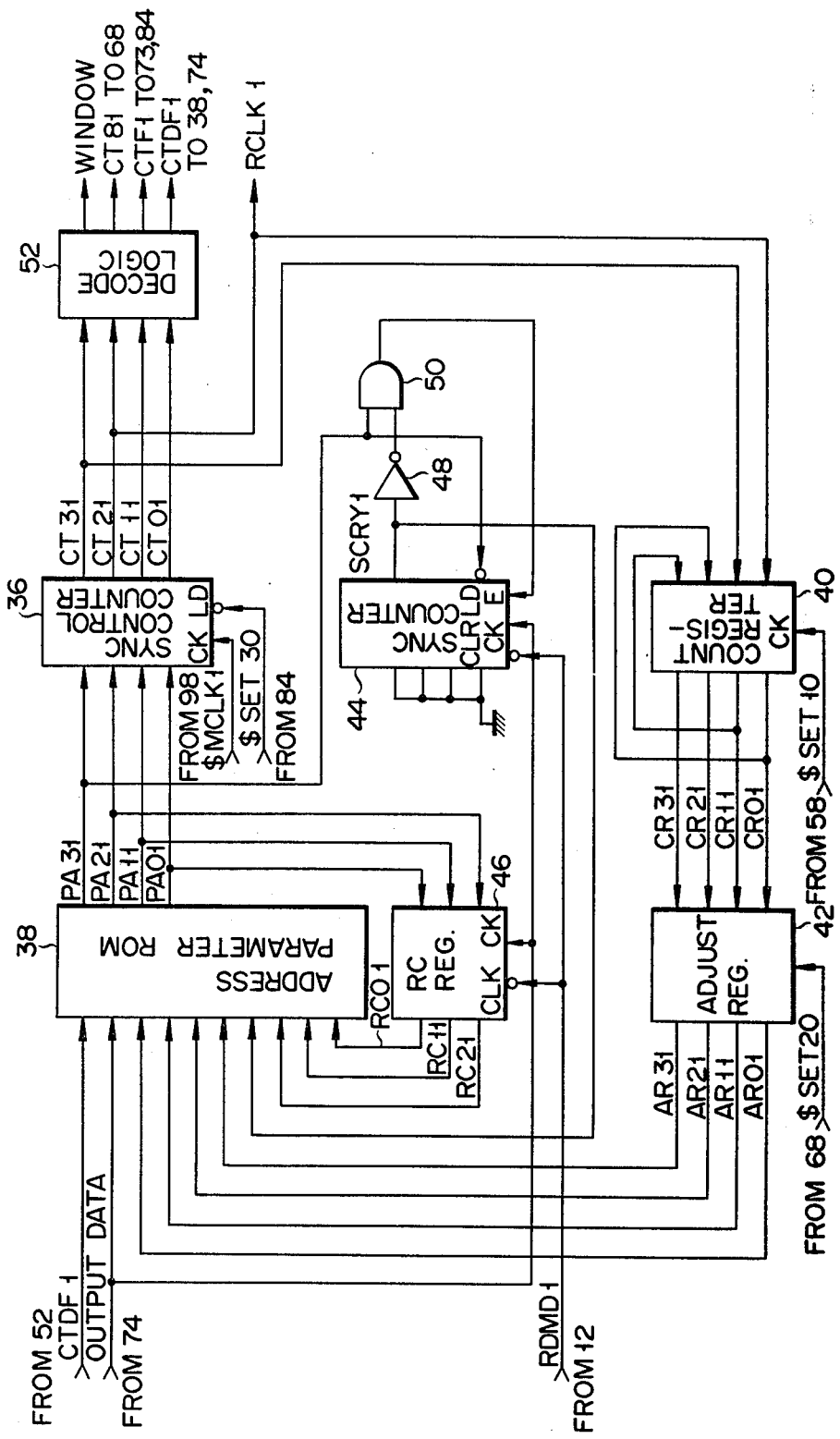
F I G. 6

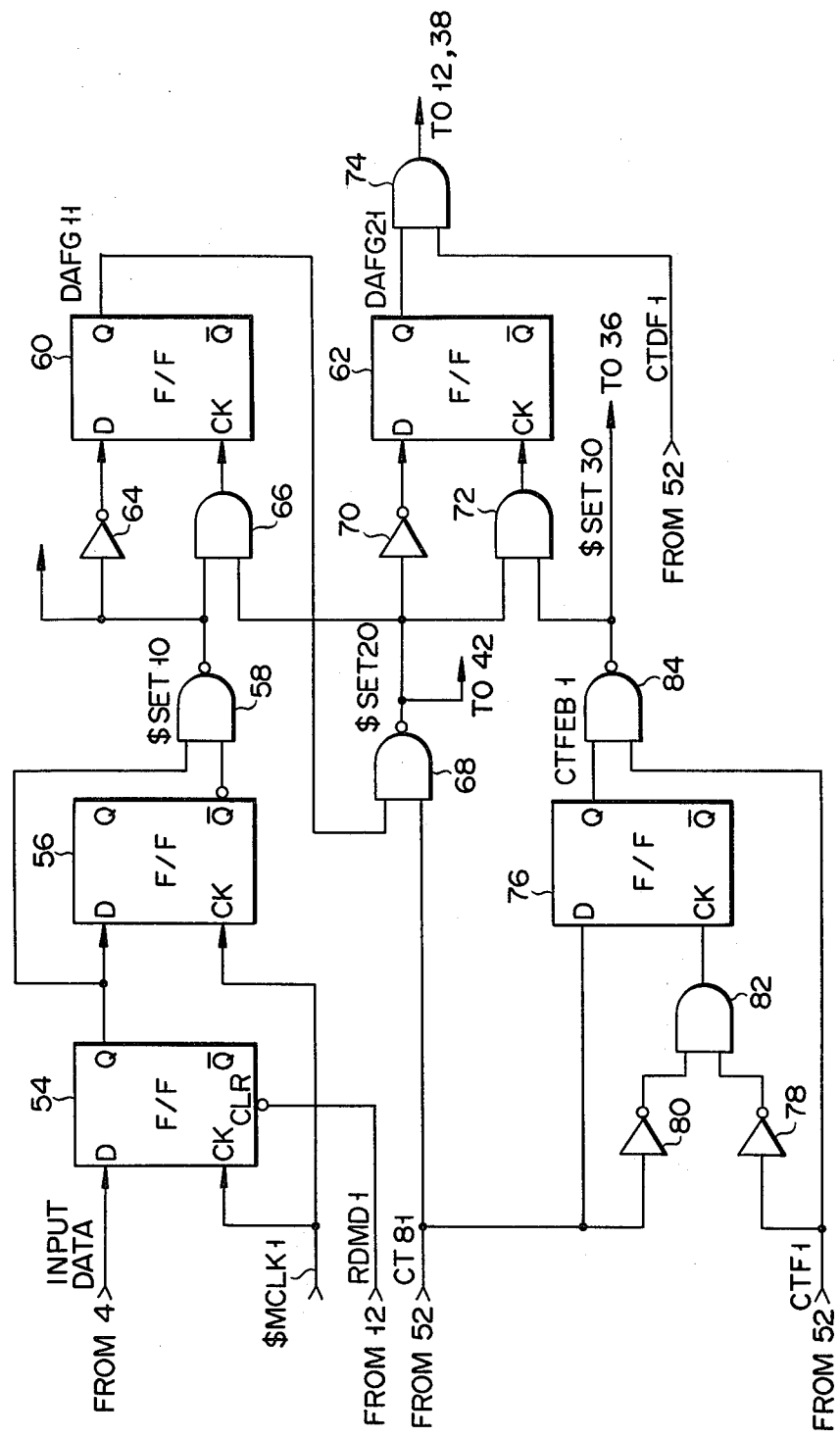
F I G. 7

| n-1 → n ↓ | INPUT DATA PRESENCE (OUTPUT DATA LOGIC "HIGH") | | | | | | | | | INPUT DATA ABSENCE (OUTPUT DATA LOGIC "LOW") | | | | | | | | |
|---|---|---|---|---|---|---|---|---|---|---|---|---|---|---|---|---|---|---|
| | $S_1S_0$ | $F_1F_0$ | $F_0F_1$ | $S_0S_1$ | $S_0F_0$ | $F_0S_1$ | $S_1S_0$ | $S_0S_1$ | $F_0F_1$ | $S_1S_0$ | $F_1F_0$ | $F_0F_1$ | $S_0S_1$ | $S_0F_0$ | $F_0S_1$ | $S_1S_0$ | $S_0S_1$ | $F_0F_1$ |
| | $F_1$ | $F_1$ | $F_0$ | $F_0$ | $S_0$ | $F_0$ | $S_1$ | $S_1$ | $S_1$ | $F_1$ | $F_1$ | $F_0$ | $F_0$ | $S_0$ | $F_0$ | $S_1$ | $S_1$ | $S_1$ |
| SYNC NOT ENTER (SCRY1 "LOW") | | | | | | | | | | | | | | | | | | |
| RC 0 | 0,0 | 0,+1 | | 1,0 | | | 0,+1 | 0,0 | 0,0 | | | | | | | | | |
| +1 | 0,+1 | 0,+2 | | 1,+1 | | | 0,0 | 0,+1 | 0,+1 | | | | | | | | | |
| +2 | 0,+2 | 0,+3 | | 1,+2 | | | 0,+1 | 0,+2 | 0,+2 | | | | | | | | | |
| +3 | 0,+3 | 0,+3 | | 1,+3 | | | 0,+2 | 0,+3 | 0,+3 | | | | | | | | | 0,0 |
| −3 | | | | | | | | | | | | | | | | | | |
| −3 | 0,−3 | 0,−2 | | 1,−3 | | | 0,−3 | 0,−3 | 0,−3 | | | | | | | | | |
| −2 | 0,−2 | 0,−1 | | 1,−2 | | | 0,−3 | 0,−2 | 0,−2 | | | | | | | | | |
| −1 | 0,−1 | 0,0 | | 1,−1 | | | 0,−2 | 0,−1 | 0,−1 | | | | | | | | | |
| SYNC ENTER (SCRY1 "HIGH") | | | | | | | | | | | | | | | | | | |
| RC 0 | 1,0 | 0,+1 | 0,+1 | 1,0 | 0,+1 | | 0,+1 | 1,0 | | | | | | | | | | |
| +1 | 1,+1 | 0,+2 | 0,+2 | 1,+1 | 0,0 | | 0,0 | 1,+1 | | | | | | | | | | |
| +2 | 1,+2 | 0,+3 | 0,+3 | 1,+2 | 0,+1 | | 0,+1 | 1,+2 | | | | | | | | | | |
| +3 | 1,+3 | 0,+3 | 0,+3 | 1,+3 | 0,+2 | | 0,+2 | 1,+3 | | | | | | | | | 0,0 |
| −3 | 1,−3 | 0,−2 | 0,−2 | 1,−3 | 0,−3 | | 0,−3 | 1,−3 | | | | | | | | | | |
| −2 | 1,−2 | 0,−1 | 0,−1 | 1,−2 | 0,−2 | | 0,−2 | 1,−2 | | | | | | | | | | |
| −1 | 1,−1 | 0,0 | 0,0 | 1,−1 | 0,−1 | | 0,−1 | 1,−1 | | | | | | | | | | |

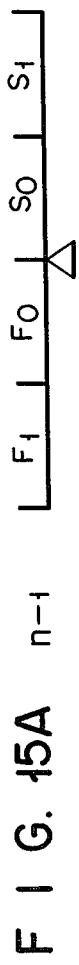
F I G. 15A
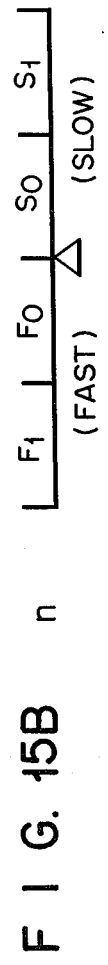
F I G. 15B
F I G. 16A
FDD RECORD FORMAT
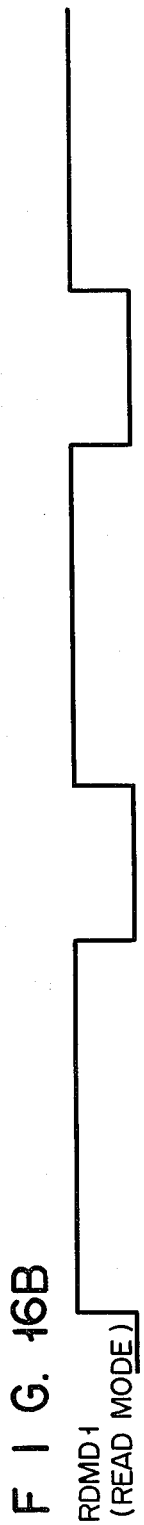
F I G. 16B
RDMD1 (READ MODE)

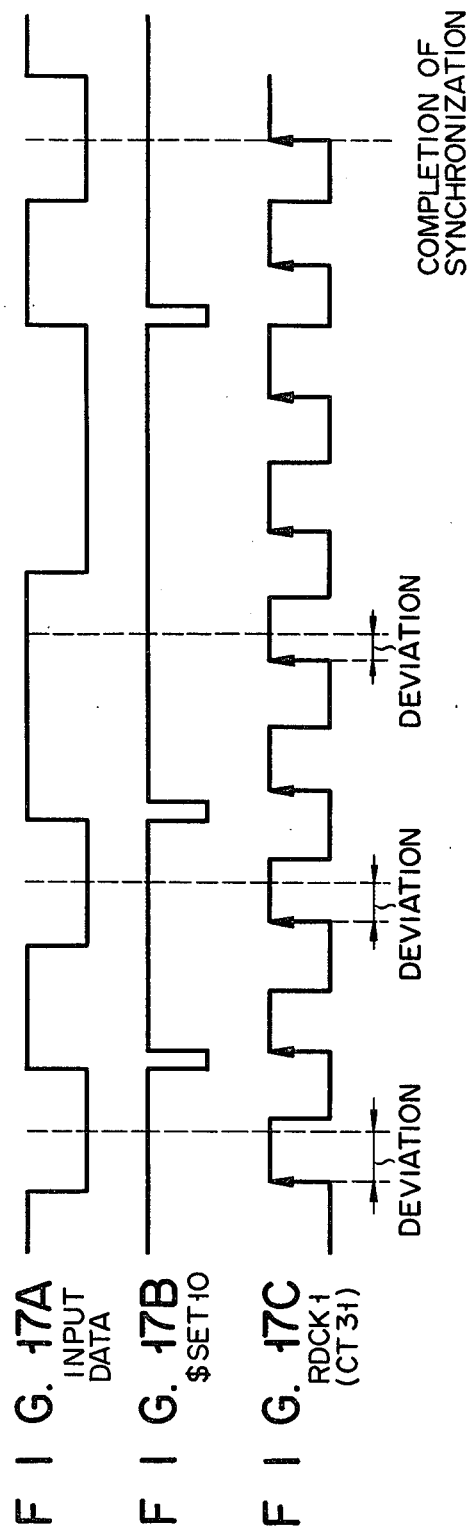

INPUT DATA SYNCHRONIZING CIRCUIT

The present invention relates to an input data synchronizing circuit suitable to be used as a variable frequency oscillator (VFO) in a floppy disk controller, or as a received data synchronizing circuit in a communications interface.

A floppy disk drive is advantageous over an exchange type disk in that it is less expensive, smaller in size and easier to maintain, as well as allowing random access. The floppy disk drive is also advantageous over a cassette tape and a paper tape in that access time is faster by one digit and reliability of data is higher. For these reasons, the number of floppy disk drives in use has recently begun to sharply increase, as warranted by the increasing demand for office computers, peripheral devices, minicomputer systems, microcomputer systems and the like.

Recently, since it became possible to utilize a large scale integrated circuit (LSI) specially designed for controlling the floppy disk, the overall system has been drastically simplified. A floppy disk drive of the IBM format type required over one hundred ICs such as medium scale integrated circuits (MSI) and small scale integrated circuits (SSI). However, these circuits have now been replaced by a single LSI, thus facilitating simple interconnection between the computer and floppy disk drives (FDDs). Thus, a single LSI is capable of performing control of the interface with the computer, as well as head control (seek) which requires precision, read/write control, control of the interface with the FDDs, error check control and so on. LSIs for the standard IBM format are currently available from various manufacturers, and controllers adapted for media of floppy disks of double-sided type or for double density are also available from various manufacturers. Also available on the market are LSIs for general purpose which allow multifunctional control, and which are designed to achieve, by simple condition settings, control function for a double-sided floppy disk, the modified frequency modulation (MFM) recording system necessary for double density recording, addition of a control function of the floppy disk drive, and so on.

FIG. 1 is a block diagram showing an interface 6 and peripherals thereof (hereinafter referred to as a CPU/FDD interface) between a general main CPU system 2 and floppy disk drives 4 (hereinafter referred to as FDDs). In the Figure, this CPU/FDD interface 6 is connected to the main CPU system 2 through a CPU interface 8 and to the FDDs 4 through an FDD interface 10. An FDD controller 12 (hereinafter referred to as an FDC) is the main part of the CPU/FDD interface 6 for performing format processing. The CPU system 2 and the CPU/FDD interface 6 are connected to a system bus 14 to which an input/output device 16 and a random access memory (RAM) 18 are also connected.

The FDD interface 10 as an interface between the FDC 12 and the FDDs 4, as shown in FIG. 2, mainly comprises four parts: a variable frequency oscillator (VFO) 20, a selector/decoder 22, a delay/select circuit 24, and a line driver/receiver 26.

The VFO 20 is generally of the construction shown in FIG. 3, and comprises a phase locked loop (PLL). The PLL 20 comprises a feed-back loop consisting of a phase comparator 28, a filter/amplifier 30, and a voltage controlled oscillator (VCO) 32. This PLL 20 allows removal of a significant amount of error data, such as speed fluctuations of the recording medium and the peak-shifts contained in the read-out data from the FDDs 4, and is thus utilized as a separating circuit for separating clock pulses from the pulses optimal for the magnetic recording medium. A data separator 34 separates data pulses from clock pulses according to a WINDOW signal. The pulse trains read out from the FDDs 4 are reproduced as data according to a DATA WINDOW signal. The read-out data obtained from the FDDs 4 is input to the VFO 20, the output signal of which becomes a DATA WINDOW signal and a CLOCK WINDOW signal (inverted signal of the DATA WINDOW signal). The input (read-out data from the FDDs 4) is input to the VFO 20 through the line driver/receiver 26. The VFO 20 generates a WINDOW signal which is synchronized with the input data and is output therewith to the FDC 12. The FDC 12 reads the data according to the WINDOW signal, performs processings such as serial or parallel conversion and CRC check, and writes the resultant data in the memory 18 according to the control of the CPU system 2.

Meanwhile, in the VFO 20, the phase comparator 28 detects the phase difference and frequency error between the input data (the read-out data from the FDDs 4) and the clock pulses obtained from the VCO 32, the filter/amplifier 30 integrates the error in the form of an analog signal, and the integrated value is supplied to the VCO 32 which then converts this analog signal into a digital signal. The voltage obtained in this manner changes the oscillating frequency of the VCO 32 and generates a WINDOW signal (boundary between the data signals and the clock pulses) in synchronism with the input data.

In a generally used disk format, SYNC fields are respectively included at the initial parts of the ID fields. Since such a SYNC field consists of the data "00", it includes clock pulses only, which are a train of pulses at equal intervals (2 $\mu$s in the case of double density). Therefore, the pulses interfere uniformly with the neighboring pulses, so no peak-shift will be caused. By locking (synchronizing) to the read-out pulse train of the SYNC field, a WINDOW signal synchronized with the input data may be obtained, as shown in FIGS. 4 and 5. FIGS. 4A to 4C show the IBM format (FDD record format) and the VFO output. FIGS. 5A to 5C show the manner in which the VFO output is synchronized, that is, the manner in which the VFO output sequentially follows the read data pulses and is synchronized (the read data pulse, i.e., the clock bit, coincides with the center of the window).

With such a conventional VFO, the VCO 32 requires many discrete parts such as resistors and capacitors, as well as high precision.

In addition, after the assembly of the final product, every assembly must be adjusted for oscillating frequency, timing pulse width and so on. Further, the current tendency is such that the number of kinds of media of floppy disks, such as double density floppy disks, minifloppy disks, double density minifloppy disks and so on, is increasing. Thus, such a conventional VFO is defective in that it is incapable of easily responding to such a variety of applications, requiring changes in elements and switching constants for different kinds of floppy disks.

It is an object of the present invention to provide an input data synchronizing circuit which eliminates the problems described above and which is readily adaptable, without requiring adjustments, to a plurality of different types of magnetic disk drives and which requires a small number of parts.

In order to accomplish this object, there is provided according to the present invention an input data synchronizing circuit comprising:

(A) a clock generator, (B) synchronous control counting means which receives an initial value, which performs predetermined counting every time a clock signal is supplied from said clock generator, and which outputs control signals representing phase status during current data input and phase status during preceding data input, as well as a WINDOW signal in synchronism with input data, and (C) a correction circuit to which are supplied said control signals from said synchronous control counting means and which outputs a correction value as said initial value for said synchronous control counting means so that said synchronous control counting means outputs said WINDOW signal in synchronism with said input data at nearly the center of a pulse width of said window signal, said initial value being supplied from said correction circuit to said synchronous control counting means which outputs said control signals to said correction circuit.

The input data synchronizing circuit of the present invention may be used as a VFO of a floppy disk interface, a received data synchronizing circuit of a communications interface, or the like. Especially when the input data synchronizing circuit of the present invention is used as a VFO, it requires a smaller number of discrete parts such as resistors and capacitors as compared with an analog VFO, and is easy to form into an LSI since it is a digital circuit. The input data synchronizing circuit of the present invention further does not require adjustment of the timing waveform of the oscillating frequency after assembly, so the number of manufacturing steps is reduced. Various types of floppy disk files may be used by simply switching the frequency of the clock signals. Since an ROM (read-only memory) is used for the counter correction data, fine counter correction may be performed, improving the precision of synchronization. The adoption of a rotation correction register reduces the adverse affects caused by rotation error of the FDD devices.

Other objects and features of the present invention will be apparent from the following description taken in connection with the accompanying drawings, in which:

FIGS. 4A to 4C show the record format of a floppy disk and the VFO signals according to the prior art, wherein FIG. 4A shows the IBM format for recording in FDDs, FIG. 4B shows the VFO output signal waveform when synchronization is achieved, and FIG. 4C shows the data pulse signals read out from the FDDs;

FIGS. 5A to 5C show the synchronization of the VFO output signals, wherein FIG. 5A shows the SYNC field, FIG. 5B shows the data pulse signals read out from the FDDs, and FIG. 5C shows the VFO output signals;

FIG. 6 is a logic diagram showing a synchronous control counter and its correction circuit according to an embodiment of the present invention;

FIG. 7 is a logic diagram for generating timing pulses to be input to the synchronous control counter and the correction circuit shown in FIG. 6;

FIGS. 9A to 9D show the operation principles of the present invention, wherein FIG. 9A shows a count value of the synchronous control counter, FIG. 9B shows the WINDOW signal waveform, FIG. 9C shows the input data waveform, and FIG. 9D shows the output data waveform;

Figure 1:
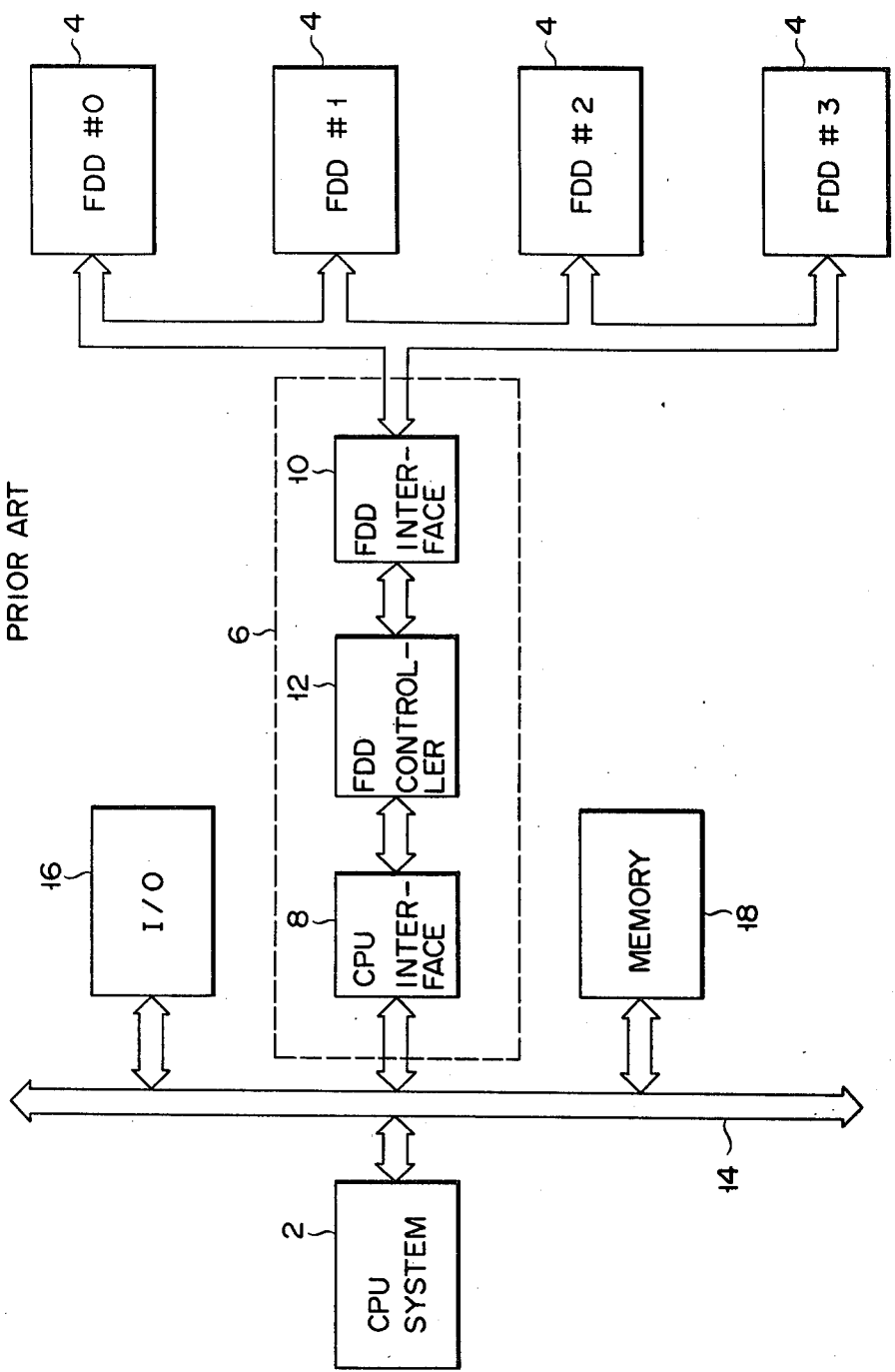
FIG. 1 is a block diagram showing an example of connection between a computer and a floppy disk control LSI according to the prior art.
Figure 2:
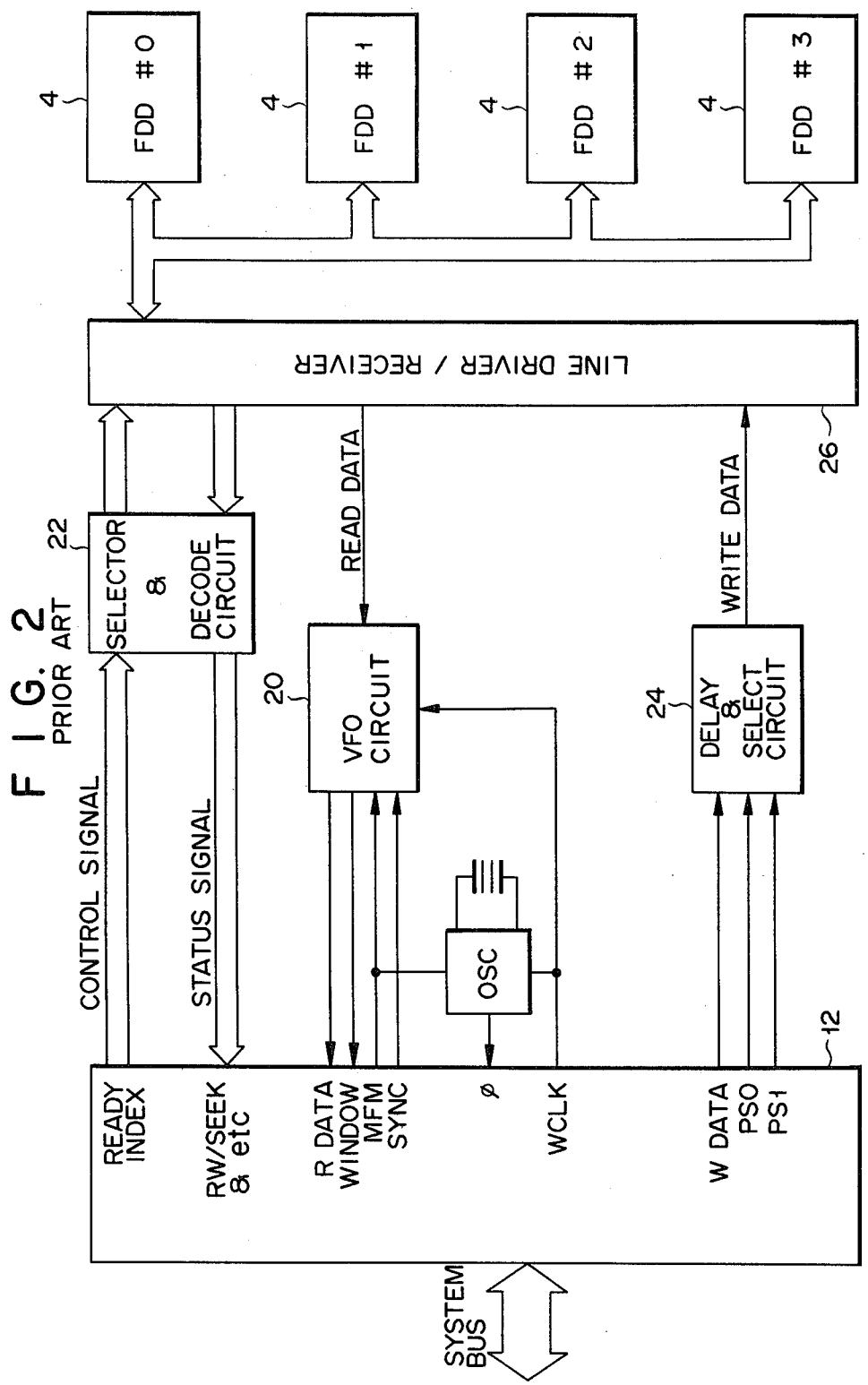
FIG. 2 is a block diagram showing the internal configuration of an FDD interface shown in FIG. 1.
Figure 3:
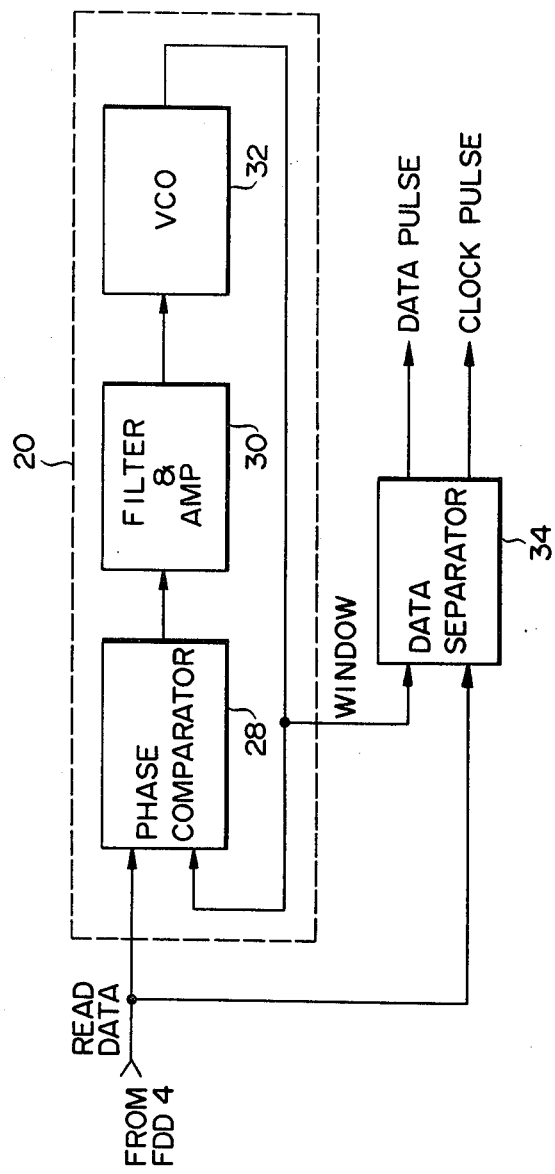
FIG. 3 is a block diagram showing the general configuration of a VFO shown in FIG. 2.
Figure 8:
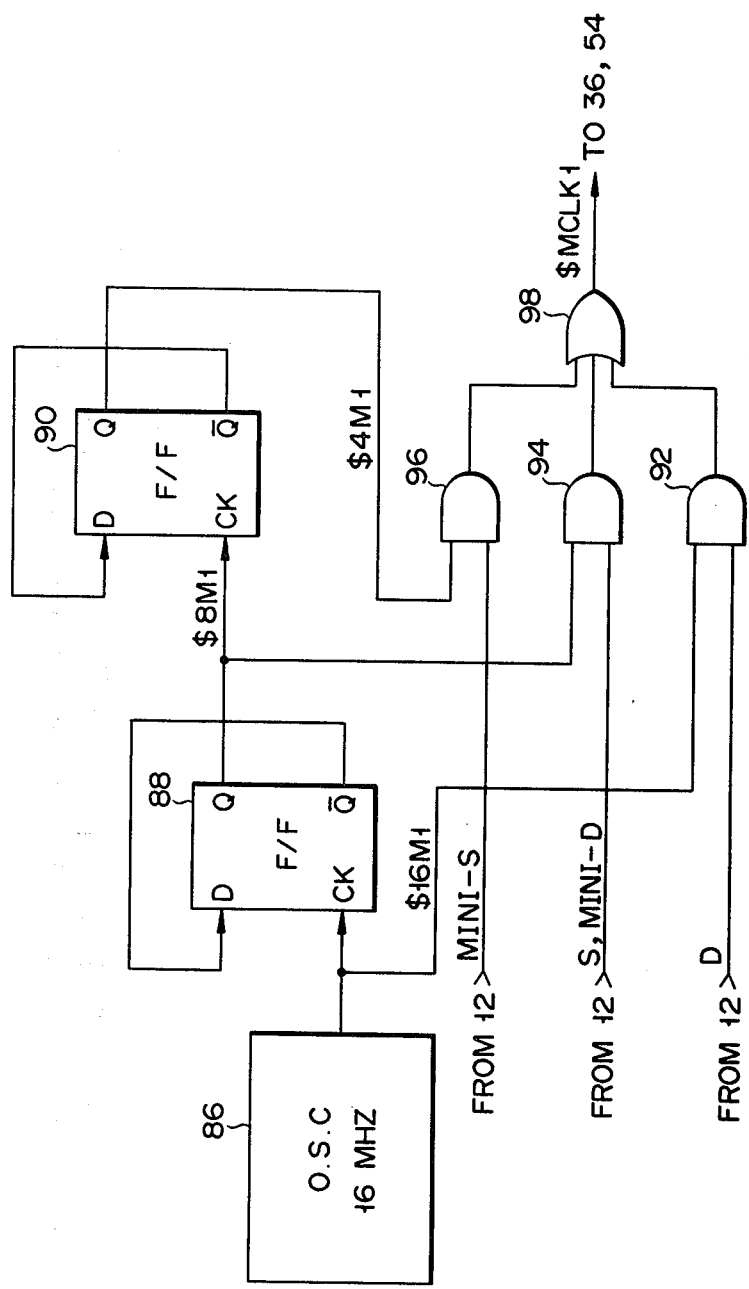
FIG. 8 is a logic diagram for switching clock signals to be used in accordance with the type of the floppy disk medium, according to the embodiment shown in FIG. 6.
Figure 10:
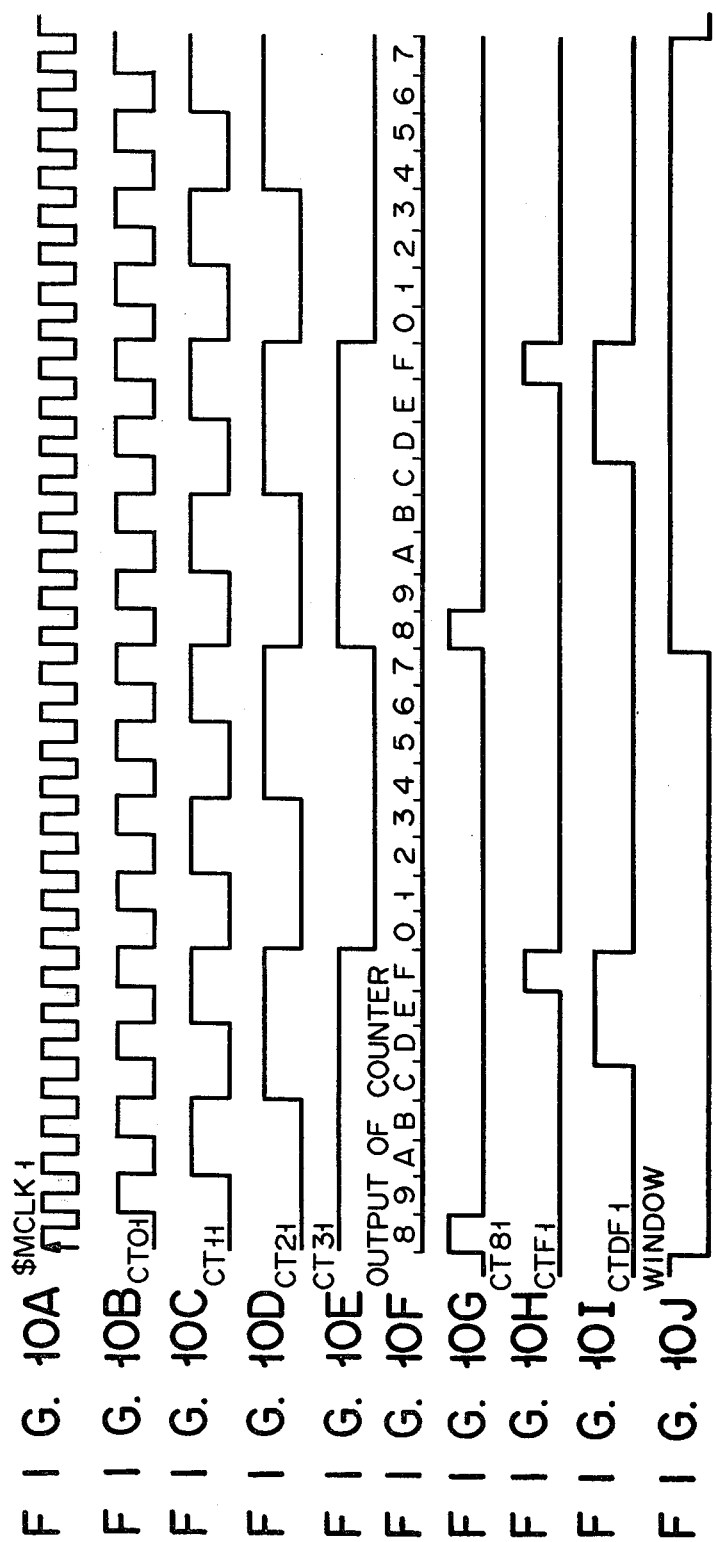
Figure 11:
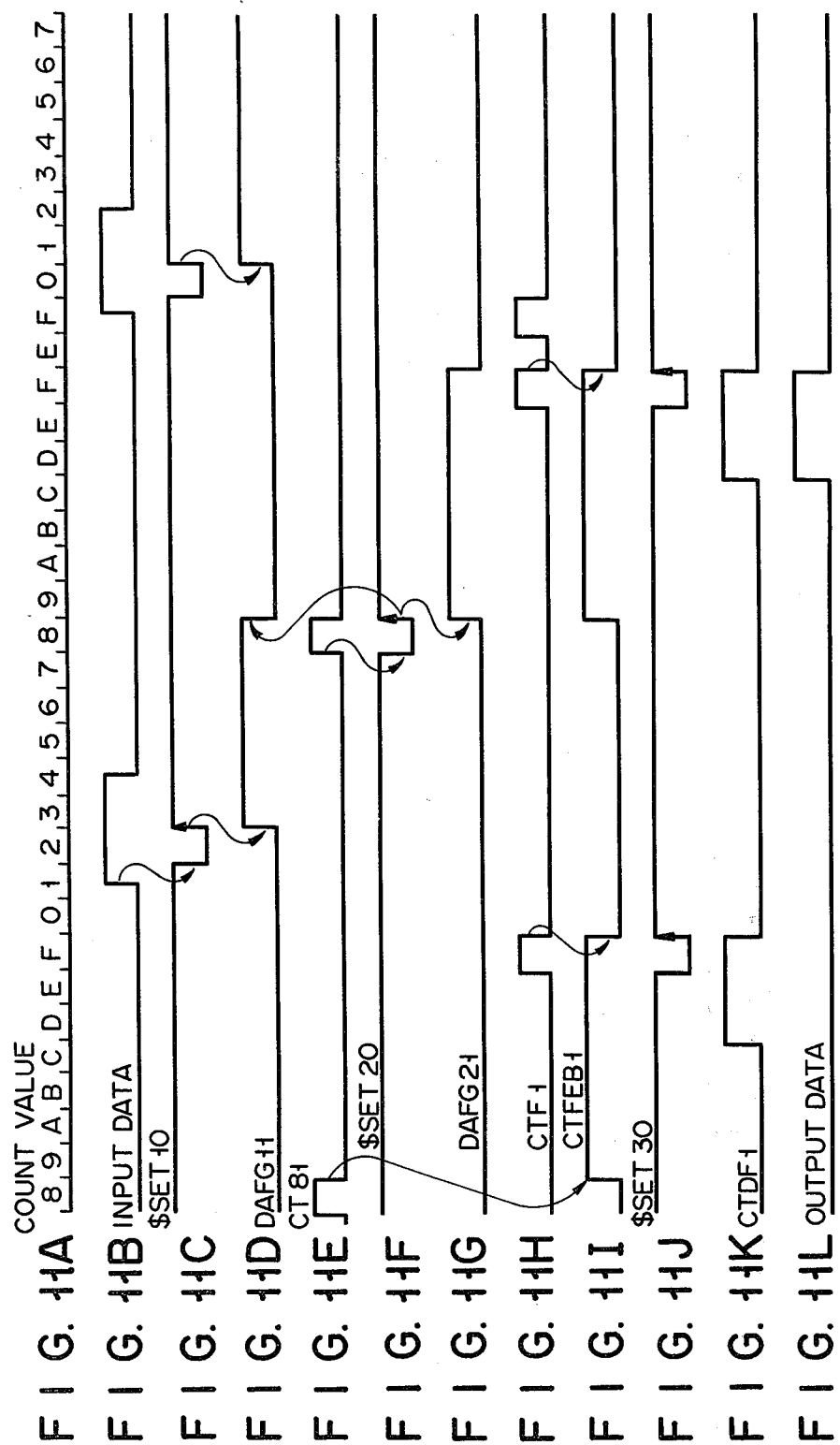

FIGS. 10A to 10J are timing charts for performing the basic operations of the synchronous control counter and a decode logic shown in FIG. 6, wherein FIG. 10A shows clock signals ($MCLK1) input to the synchronous control counter, FIGS. 10B to 10E respectively show output values of four bits output from the synchronous control counter, FIG. 10F shows the count value of the synchronous control counter, and FIGS. 10G to 10J show output signals of the decode logic according to the embodiment shown in FIG. 6, with FIGS. 10G to 10I showing timing signals supplied to the logic circuit shown in FIG. 7, and FIG. 10J showing the WINDOW signal;

FIGS. 11A to 11L are timing charts for showing the operation of the circuit according to the embodiment shown in FIGS. 6 and 8, wherein FIG. 11A shows the count value of the synchronous control counter, FIG. 11B shows the input data, FIG. 11C shows $SET10 signals, FIG. 11D shows DAFG11 signals, FIG. 11E shows CT81 signals, FIG. 11F shows $SET20 signals, FIG. 11G shows DAFG21 signals, FIG. 11H shows CTF1 signals, FIG. 11I shows CTFEB1 signals, FIG. 11J shows $SET30 signals, FIG. 11K shows CDTF1 signals, and FIG. 11L shows the output data;

FIGS. 12A to 12L are timing charts showing the operation of another embodiment of the present invention as in the case of FIG. 11, wherein FIG. 12A shows the count value of the synchronous control counter, FIG. 12B shows $SET10 signals, FIG. 12C shows $SET20 signals, FIG. 12D shows $SET30 signals, FIG. 12E shows CTDF1 signals, FIG. 12F shows the output data, FIG. 12C shows counter register outputs (CR01, CR11), FIG. 12H shows counter register outputs (CR21, CR31), FIG. 12I shows adjust register outputs (AR01 to AR31), FIG. 12J shows RC register outputs (RC01 to RC31), FIG. 12K shows SCRY1 signals, and FIG. 12L shows parameter ROM outputs (PA01 to PA31);

Figure 13:
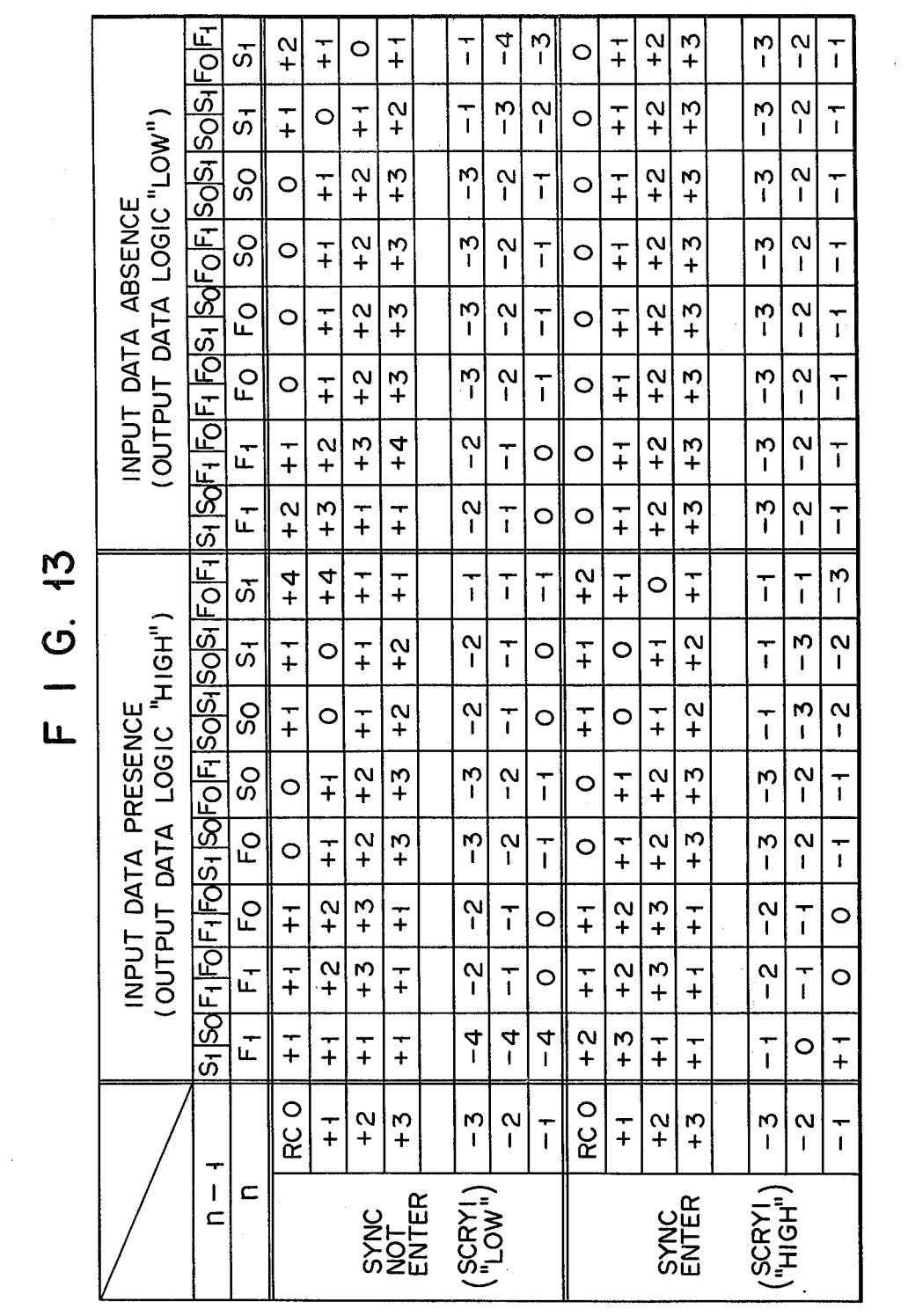

FIGS. 13 and 14 show the contents of the parameter ROMs, i.e., the correction data for the synchronous control counter and the correction data for the RC register and the synchronous control counter;

FIGS. 15A and 15B show at which parts of the data window the data input pulses are synchronized during input of current data (n) and input of immediately preceding data (n−1); and FIGS. 16A and 16B, and FIGS. 17A to 17C, are timing charts showing the operation (synchronization of the received clock signals according to the input data) according to the embodiment wherein the present invention is applied to a received data synchronizing circuit of a communications interface, wherein FIG.

16A is a timing chart of the record format into the FDDs, FIG. 16B is a timing chart of read mode signals, FIG. 17A is a timing chart of input data, FIG. 17B is a timing chart of $SET10 signals, and FIG. 17C is a timing chart of CT31 signals.

FIGS. 6, 7 and 8 are block diagrams showing an embodiment of an input data synchronizing circuit according to the present invention.

Referring to FIG. 6, reference numeral 36 denotes a synchronous control counter of four bits, whose count value is variable for synchronization with the input data. In the synchronous control counter 36 is set an initial value (variable) from a parameter ROM 38 to be described later for performing predetermined counting every time a clock signal is input. To a clock terminal CLK of this synchronous control counter 36 are supplied drive clock signals $MCLK1 for driving the circuit, and to a load terminal LD thereof are supplied counter correction timing signals $SET30 to be described later. Four-bit signals CT01 to CT31 obtained from the synchronous control counter 36 are supplied to a decode logic 52 to be described later, and the upper two significant bits CT21 and CT31 are also supplied to a 4-bit count register 40 to be described later. The output of the count register 40 is latched in an adjust register 42, and the upper two significant bits CR01 and CR11 of this output are also fed back to the input terminal of the counter register 40 where they are shifted by two bits and reinput. This is performed for holding the respective upper two significant bits of the synchronous control counter 36 at the time when the data is input and at the time when the immediately preceding data is input. To a clock terminal CK of this count register 40 are supplied $SET10 signals to be described later. The adjust register 42 is of 4-bit construction, receives the outputs CR01 to CR31 from the count register 40, and holds its contents until the contents of the synchronous control counter 36 are corrected according to the contents of the count register 40. To a clock terminal CK of the adjust register 42 are supplied $SET20 signals to be described later. The output of the adjust register 42 is supplied to the parameter ROM 38. This parameter ROM 38 sets an initial value (count value correction value) in the synchronous control counter 36. Four-bit outputs PA01 to PA31 of the parameter ROM 38 are supplied to the synchronous control counter 36; the most significant bit PA31 is also supplied to a synchronous counter 44 to be described later, while the remaining three bits PA01 to PA21 are also supplied to an RC register 46 to be described later. The RC register 46 is a 3-bit register for correction of rotation error, which calculates the rotation error of the FDDs 4 from the input data and holds the obtained data. To a clock terminal CK of the RC register 46 is supplied the output data from the FDC 12, and to a clear terminal CLR thereof is supplied a read mode signal RDMD1 obtained from the FDC 12. Three-bit outputs RC01 to RC21 of the RC register 46 are supplied as a part of the address to the parameter ROM 38. A synchronous counter 44 is a 4-bit synchronous counter for detecting whether or not synchronization has been achieved after the initialization of the data input. The input terminal of the synchronous counter 44 is all-bit grounded. To a clock terminal CK thereof is supplied the output data from the FDC 12, to a load terminal LD is supplied the most significant bit output PA31 of the parameter ROM 38, and to a clear terminal CLR is supplied the read mode signal RDMD1 obtained from the FDC 12. An output SCRY1 of the synchronous counter 44 becomes a part of the address for the parameter ROM 38 as well as being supplied to one input terminal of an AND gate 50 through an inverter 48. The most significant bit output PA31 of the parameter ROM 38 is supplied to the other input terminal of the AND gate 50. An AND output is supplied to an enable terminal E of the synchronous counter 44. The decode logic 52 receives the signals CT01 to CT31 obtained from the synchronous control counter 36, and outputs signals CT81, CTF1, CTDF1 along with a SAMPLING WINDOW signal corresponding to the respective count positions. These signals will be described in greater detail hereinafter.

Referring to FIG. 7, D-type flip-flops 54 and 56 detect input data and generate the $SET10 signals. To an input terminal D of the flip-flop 54 is supplied the input data from the FDDs 4, and to a clock terminal CK thereof are supplied the drive clock signals $MCLK1. These clock signals $MCLK1 are also supplied to a clock terminal CK of the flip-flop 56. To a clear terminal CLR of the flip-flop 54 is supplied the read mode signal RDMD1 obtained from the FDC 12. A Q output of the flip-flop 54 is supplied to an input terminal D of the flip-flop 56 as well as to one input terminal of a NAND gate 58. A $\overline{Q}$ output of the flip-flop 56 is supplied to the other input terminal of the NAND gate 58. D-type flip-flops 60 and 62 are data flag flip-flops for holding the input data as flags. To an input terminal D of the data flag flip-flop 60 are supplied the $SET10 signals output from the NAND gate 58 through an inverter 64. To a clock terminal CK of the data flag flip-flop 60 are supplied these $SET10 signals through an AND gate 66. $SET20 signals to be described later are supplied to the other input terminal of the AND gate 66. The output of the data flag flip-flop 60 is output as timing signals DFAG11 which are supplied to one input terminal of a NAND gate 68. A signal CT81 obtained from the decode logic 52 is supplied to the other input terminal of the NAND gate 68. The output of the NAND gate 68 becomes the timing signals $SET20 which are supplied to an input terminal D of the data flag flip-flop 62 through an inverter 70. To a clock terminal CK of the data flag flip-flop 62 is supplied an AND output (output from an AND gate 72) of the $SET20 signals and the $SET30 signals to be described later. A Q output of the data flag flip-flop 62 is supplied as the timing signals DAFG21 to one input terminal of an AND gate 74. Signals CTDF1 output from the decode logic 52 are supplied to the other input terminal of the AND gate 74, and the output of this AND gate 74 is supplied to the FDC 12.

A D-type flip-flop 76 inhibits the continuous output of the timing signals $SET30 in response to signals CTF1 obtained form the decode logic 52. To an input terminal D of the flip-flop 76 are supplied the CT81 signals output from the decode logic 52. The CTF1 signals are supplied to one input terminal of an AND gate 82 through an inverter 78, and the CT81 signals are supplied to the other input terminal of the AND gate 82 through an inverter 80. The output of the AND gate 82 is supplied to a clock terminal CK of the flip-flop 76. The Q output of the flip-flop 76, timing signals CTFEB1, are supplied to one input terminal of a NAND gate 84. The CTF1 signals are supplied to the other input terminal of the NAND gate 84, the output of which becomes the $SET30 signals.

FIG. 8 is a logic diagram of a circuit for switching the clock signals to be used according to the type of floppy disk medium used. A basic clock generator 86 outputs oscillation frequency signals of 16 MHz. D-type flip-flops 88 and 90 function to divide the oscillation frequency signals of 16 MHz into signals of 8 MHz and 4 MHz. The output frequency signals of 16 MHz from the basic clock frequency generator 86 are supplied to a clock terminal CK of the flip-flop 88 as well as to one input terminal of an AND gate 92. A Q output of the flip-flop 88, frequency signals $8M1 of 8 MHz, are supplied to a clock terminal CK of the flip-flop 90 of the latter stage, as well as to one input terminal of an AND gate 94. Oscillation frequency signals $4M1 of 4 MHz as the Q output of the flip-flop 90 are supplied to one input terminal of an AND gate 96. $\bar{Q}$ outputs of the flip-flops 88 and 90 are connected to respective input terminals D of the same flip-flops. To the other input terminals of AND gates 92, 94 and 96 are respectively supplied from the FDC 12 a signal D representing that the medium is of standard double density (8 inches in diameter), a signal S or MINI-D representing that the medium is of standard single density of mini-double density (5 inches in diameter) respectively, and a signal MINI-S representing that the medium is of mini-single density. The respective outputs of the AND gates 92, 94 and 96 are supplied to an OR gate 98 which selects one of them to output clock signals $MCLK1 to the clock terminal CK of the synchronous control counter 36 and to the clock terminal CK of the flip-flop 54.

Figure 9:
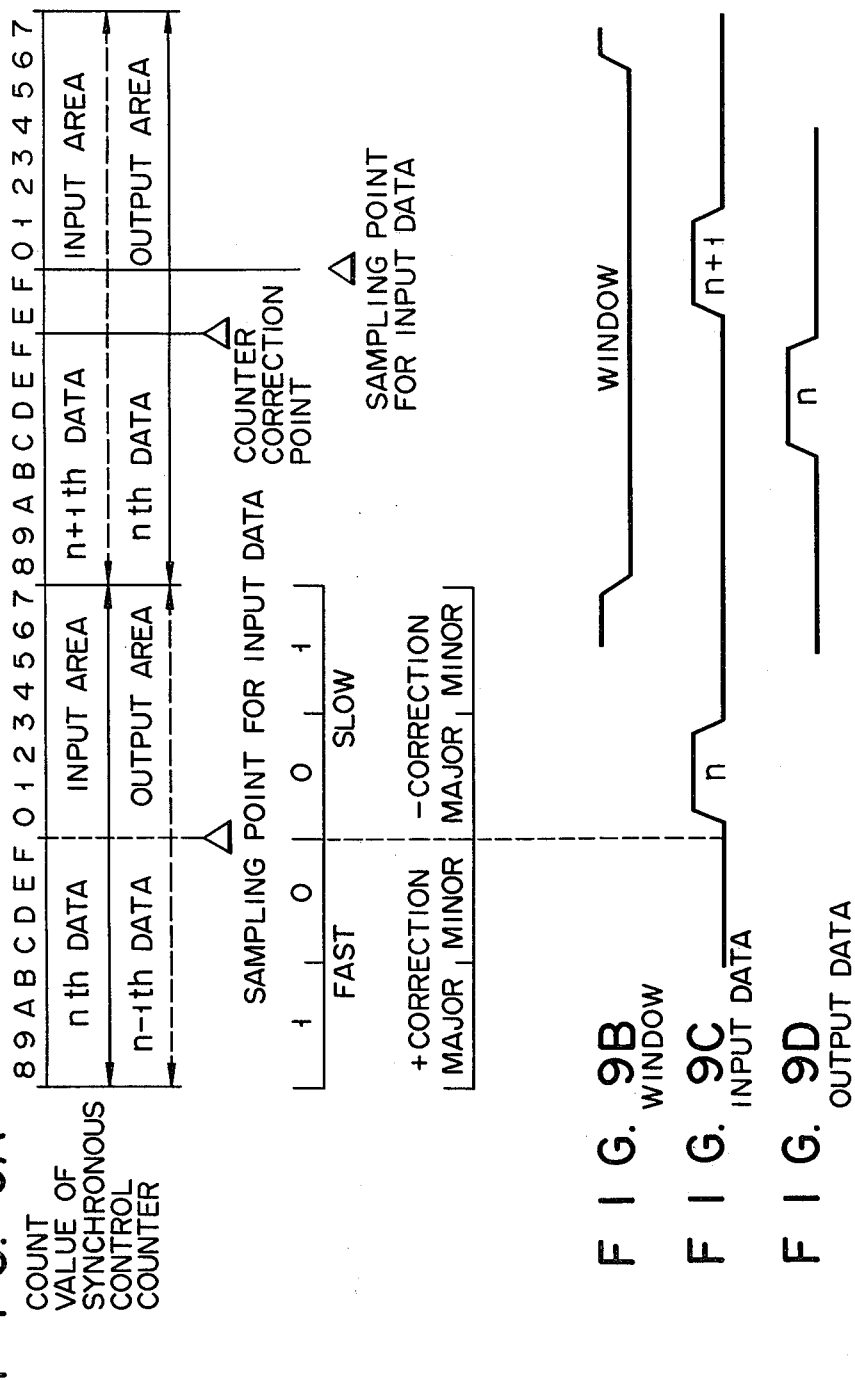

FIGS. 9A to 9D conceptually show the operation principles of the present invention. FIG. 9A shows the count value of the synchronous control counter, FIG. 9B shows the waveform of the WINDOW signal, FIG. 9C shows the waveform of the input data, and FIG. 9D shows the waveform of the output data. Referring to FIG. 9A, the region "8→9→ . . . →7" is the region for picking up the input data and the subsequent region "8→ . . . →7" is the region for outputting data. According to this embodiment, the pulse width of the WINDOW signal is divided into four regions; it is judged that the input data is within the central two regions among these four divided regions. Therefore, the count value of the synchronous control counter 36 is corrected to synchronize the input data with the count value of the synchronous control counter 36 so that the input data may be constantly kept at this position. When the input data is shifted toward the SLOW side from the central position, the count value is corrected at the counter correction point in the manner, "E→F-→E→F→0→1→ . . . " so that the next data may approach the center of the pulse width. Conversely, when the input data is shifted toward the FAST side, the count value is corrected at the counter correction point in the manner "E→F→1→2→ . . . " so that the next input data may draw near to the center of the pulse width.

FIGS. 10A to 10J are timing charts showing the basic operations of the synchronous control counter 36 and the decode logic 52 wherein FIG. 10A is a timing chart of the clock signals ($MCLK1) input to the synchronous control counter 36, FIGS. 10B to 10E are timing charts showing the respective four bits of the output from the synchronous control counter 36, FIG. 10F is a timing chart of the count value of the synchronous control counter 36, and FIGS. 10G to 10J are timing charts of the output signals of the decode logic of the embodiment shown in FIG. 6, the output signals of FIGS. 10G to 10I being the timing signals supplied to the decode logic shown in FIG. 7 and FIG. 10J being a timing chart of the WINDOW signals.

FIGS. 11A to 11L are timing charts for the operation of the embodiment shown in FIGS. 6 and 8 wherein FIG. 11A is a timing chart of the count value of the synchronous control counter 36; FIG. 11B, of the input data; FIG. 11C, of the $SET10 signals; FIG. 11D, of the DAFG11 signals; FIG. 11E, of the CT81 signals; FIG. 11F, of the $SET20 signals; FIG. 11G, of the DAFG21 signals; FIG. 11H, of the CTF1 signals; FIG. 11I, of the CTFEB1 signals; FIG. 11J, of the $SET30 signals, FIG. 11K, of the CTDF1 signals; and FIG. 11L, of the output data.

FIGS. 12A to 12L are timing charts showing the operation of the embodiment of the present invention as FIG. 11 wherein FIG. 12A is a timing chart of the count value of the synchronous control counter; FIG. 12B, of the $SET10 signals; FIG. 12C, of the $SET20 signals; FIG. 12D, of the $SET30 signals; FIG. 12E, of the CTDF1 signals, FIG. 12F, of the output data; FIG. 12G, of the count register outputs (CR01, CR11); FIG. 12I, of the adjust register outputs (AR01 to AR31); FIG. 12J, of the RC register outputs (RC01 to RC31); FIG. 12K, of the SCRY1 signals, and FIG. 12L, of the parameter ROM outputs (PA01 to PA31).

The mode of operation of the input data synchronizing circuit of the present invention will now be described in detail. A generator for generating clock signals ($MCLK1) signals for driving the circuit of the present invention will first be described with reference to FIG. 8. The record format and the density of the FDDs change according to the medium used. According to such changes, the operation mode of the input data synchronizing circuit of the present invention must also be changed. According to the input data synchronizing circuit of the present invention, the operation mode is changed by switching the frequency of the clock signals ($MCLK1). The basic frequency 16 MHz of the basic clocks obtained from the basic clock generator 86 is divided into clock frequencies of 8 MHz ($8M1) and 4 MHz ($4M1), respectively, by the flip-flops 88 and 90. Thus, in the case of the standard double density floppy disk, the clock signals of 16 MHz are selected as the clock signals ($MCLK1).

The basic operation of the synchronous control counter 36 and the decode logic 52 will now be described with reference to FIGS. 10A to 10J. At the leading edges of the clock signals $MCLK1 shown in FIG. 10A, the synchronous control counter 36 is incremented so that the respective signals of CT01, CT11, CT21 and CT31 shown in FIGS. 10B to 10E are output. The content of the synchronous control counter 36 will hereinafter be called the count value and will be expressed as "0·1·2 . . . E·F". At the counter correction point, the $SET30 signals are supplied to the load terminal LD of the synchronous control counter 26, and the outputs PA31, PA21, PA11 and PA01 of the parameter ROM 38 are loaded in the synchronous control counter 36, thus setting the initial value. The outputs CT01, CT11, CT21 and CT31 of the synchronous counter 36 are supplied to the decode logic 52 to be decoded thereby. Consequently, the decode logic 52 outputs the WINDOW signals in correspondence with the respective count values and also supplies the CT81 signals to the NAND gate 68 (FIG. 7), the CTF1 signals to the inverter 78 and to the NAND gate 84, and the CTDF1 signals to the AND gate 74.

Figure 12:
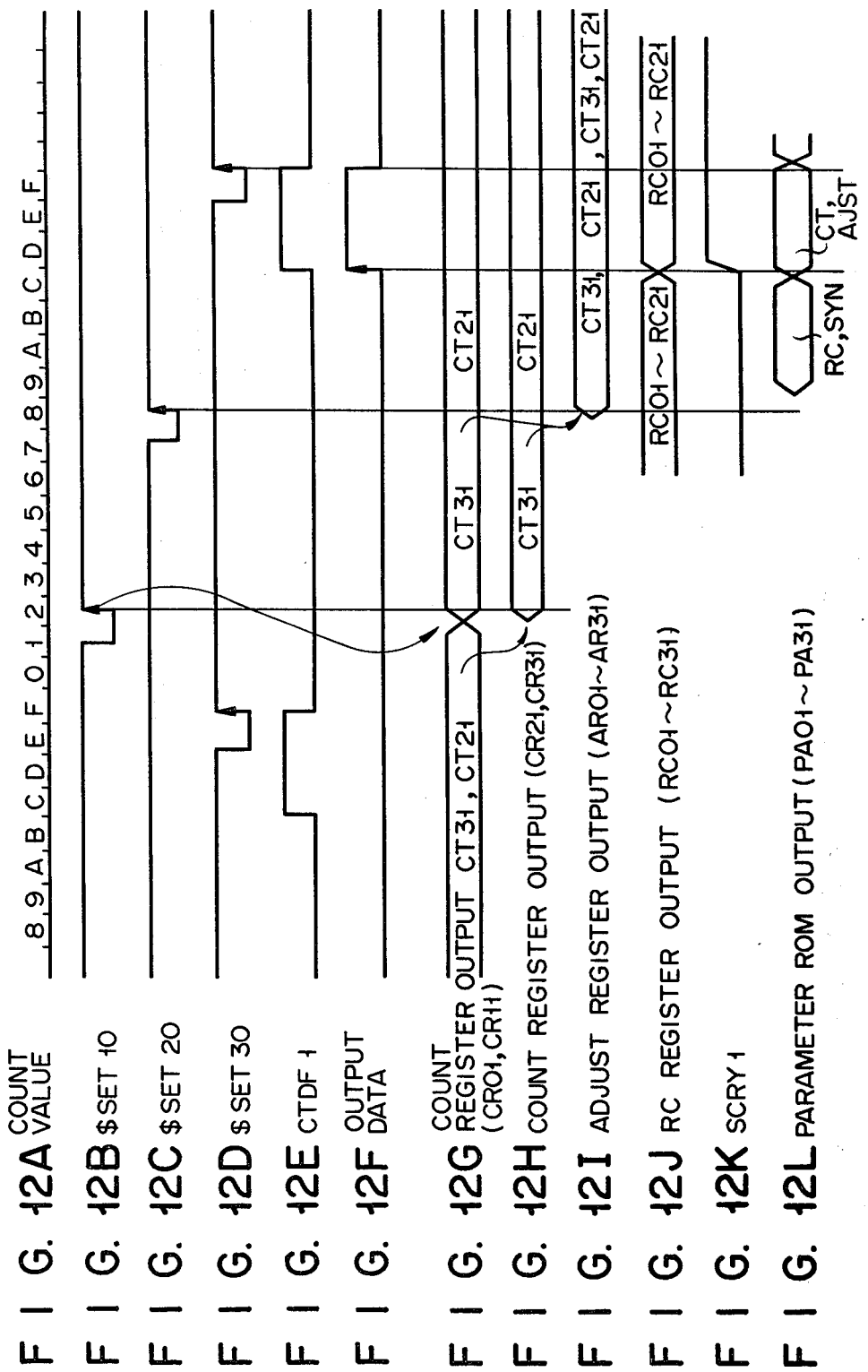

The mode of operation of the embodiment shown in FIGS. 6 and 7 will now be described with reference to the timing charts shown in FIGS. 11 and 12.

Upon input of data, the flip-flops 54 and 56 and the NAND gate 58 shown in FIG. 7 generate the $SET10 signals. These $SET10 signals set the data flag flip-flop 60 and are supplied to the terminal CK of the count register 40. As a result, the upper two significant bits (CT31, CT21) of the output of the synchronous control counter 36 are set in the lower two significant bits (CR01, CR11) of the count register 40. At the same time, the outputs CT31 and CT21 of the synchronous control counter 36 set in the lower two significant bits (CR01, CR11) of the count register 40 upon the immediately preceding data input are shifted to the upper two significant bits (CR31, CR21) of the count register 40.

According to this embodiment, as shown in FIG. 11A, when the count value of the synchronous control counter 36 becomes "8", the CT81 signals shown in FIG. 11E are output from the decode logic 52. These CT81 signals are applied to one input terminal of the NAND gate 68 (FIG. 7), to the other input terminal of which are supplied the DAFG11 signals (FIG. 11D) which are the Q output of the data flag flip-flop 60 to take the NAND condition so that the $SET20 signals as shown in FIG. 11F are generated. These $SET20 signals are supplied to the data flag flip-flop 62 whereupon the DAFG21 signals as shown in FIG. 11G are obtained from the Q output of the flip-flop 62. Simultaneously with this, the DAFG21 signals are supplied to the flip-flop 60 through the AND gate 66 to reset the flip-flop 66. Further, as shown in FIGS. 12G and 12H, the content of the count register 40 is transferred to the adjust register 42 and the count register 40 is prepared for the next input data.

Referring to FIG. 11A, when the count values of the synchronous control counter 36 becomes "D", "E" and "F", the timing signals CTDF1 are output from the decode logic 52 as shown in FIG. 11K. A logic product (AND) of the CTDF1 signal with the DAFG21 signal (FIG. 11G), the Q output of the flip-flop 62, is obtained at the AND gate 74 shown in FIG. 7 and the output data as shown in FIG. 11L is prepared. Referring to FIG. 11A, when the count value of the synchronous control counter 36 becomes "F", the CTF1 signal is output from the decode logic 52 as shown in FIG. 11H. An inverted logic product (NAND) of the CTF1 signal with the CTFEB1 signal (FIG. 11I), the Q output of the flip-flop 76, is obtained at the NAND gate 84, and the counter correction signal $SET30 as shown in FIG. 11J is obtained. The flip-flop 76 is set by the timing signal CT81 obtained from the decode logic 52 and is reset by the CTF1 signal obtained similarly from the decode logic 52 (FIGS. 11E, 11H and 11I). Accordingly, when the counter correction as shown in FIG. 11 is " . . . D→E→F→E→F→0→1→ . . . ", the $SET30 signal is generated only at the first CTF1 signal (see latter parts of FIGS. 11H, 11I and 11J). By the counter correction timing signal $SET30, the outputs PA31, PA21, PA11 and PA01 of the parameter ROM 38 are loaded in the synchronous control counter 36. Thereafter, the correction is repeated until the input is sufficiently near to the center of the WINDOW signal.

The mode of operation of the rotation correction RC register 46 will next be described. The RC register 46 holds the 3-bit rotation correction data. The synchronous control counter 36 operates as a 4-bit hexadecimal counter and corrects the count value according to the input data, thus establishing the synchronization. However, when the speed of the input data deviates from the reference value due to rotational error or the like of the motor at the FDD 4, synchronization becomes difficult to attain by the correction at each point. Especially in the worst case of double density recording, only one data pulse is input for four cycles of WINDOW signal and the peak-shift is great, resulting in asynchronism. As a countermeasure to this problem, the deviations of the input data from the reference, that is, the deviations toward the FAST or SLOW side with respect to the hexadecimal count time, are set in the RC register 46 as shown in FIG. 9A. When the input data is shifted 1/16 count toward the FAST side, +1 (001) is set. When the input data is shifted 2/16 count toward the FAST side, +2 (002) is set. When the input data is shifted 1/16 count toward the SLOW side, −1 (1111 as the 2's complement) is set. When the input data is shifted 2/16 count toward the SLOW side, −2 (110 as the 2's complement) is set. For preparing the count correction data, the values are determined according to the content of the RC register 46 as the reference. The data setting into the RC register 46 is performed by the leading edges of the three lower significant bits PA21, PA11 and PA01 of the parameter ROM 38 as shown in FIGS. 12J and 12L.

The synchronous counter 44 is, as described above, a 4-bit hexadecimal counter for indicating whether or not the input data is synchronized with the content of the synchronous control counter 36. Before the data is input, the content of the synchronous control counter 44 is "0" and the SCRY1 signal as its output is at IC level LOW (below the threshold level). When the data input is initiated, and the input data is input in the FAST0 or SLOW0 region near the WINDOW signal at the center, the synchronous control counter 44 is counted up. When the input data is shifted to the FAST1 or SLOW1 region greatly shifted from the sampling point at the center, "0" is loaded and the counter is cleared thereafter. Then, when the counted value of the counter 44 becomes 16, the SCRY1 signal becomes IC level HIGH (above the threshold level) as shown in FIG. 12K and the subsequent incrementing is suppressed, indicating that the input data has been synchronized with the content of the synchronous control counter 36.

The operation described above is generally performed during the input of the SYNC code data (FIG. 4A) of the FDD record format. When the SCRY1 signal is at IC level LOW (hereinafter referred to as SYNC NOT ENTER mode), the parameter ROM 38 makes the count correction value greater for quickly drawing the input data near to the WINDOW signal at the center. When the SCRY1 signal is at IC level HIGH (hereinafter referred to as SYNC ENTER mode), the parameter ROM 38 makes the correction value smaller. The synchronous counter 44 is cleared when the PA31 signal as the output of the parameter ROM 38 is at logic LOW level at the leading edge of the output data signal, and it increments when the PA31 signal is at logic HIGH level, as in the case of the RC register 46.

The content of the parameter ROM 38 will now be described. The table in FIG. 13 shows the correction data for the synchronous control counter 36, and the table in FIG. 14 shows the correction data for the RC register 46 and the synchronous counter 44. When the timing signal CTDF1 obtained from the decode logic 52 is at IC level HIGH, the data as shown in FIG. 13 is obtained from the parameter ROM 38. When the CTDF1 signal is at IC level LOW, the data as shown in FIG. 14 is obtained from the parameter ROM 38. The content of the parameter ROM 38 is set according to the conditions described below:

(1) The counter correction value is made greater in the presence of output data and is made smaller in the absence of output data.

(2) Adjust register

In the adjust register 42 are held the upper two significant bits (CT31, CT21) of the synchronous control counter 36 upon input of the current data (n) and the immediately preceding data (n−1), which hold the relationship as shown in FIGS. 15A and 15B and Table 1. Referring to these figures, in the case of F1, since it is greatly shifted from the center (marked by Δ), a correction of a large increment is made. In the case of F0, a correction of a small increment is made. In the case of S1, correction of a large decrement is made, and in the case of f0, a correction of a small decrement is made.

TABLE 1

|  | CT31 | CT21 |
| --- | --- | --- |
| F1 | H | L |
| F0 | H | H |
| S0 | L | L |
| S1 | L | H |

(3) Synchronous counter (SCRY1)

When the SCRY1 signal is at IC level LOW (SYNCH NOT ENTER mode), synchronization is sought and the counter correction value is increased. On the other hand, when the SCRY1 signal is at IC level HIGH (SYNC ENTER mode), synchronization has been achieved and the counter correction value is made smaller.

(4) RC register (3-bit RC21, RC11, RC01)

Utilizing the output of the rotation correction RC register 46 as the reference, the count correction data is prepared adding the conditions of items (1), (2) and (3) above. The relationship between the count correction data (FIG. 13) and the output of the parameter ROM 38 is shown in Table 2.

TABLE 2

| Parameter ROM | ROM output | | | | Synchronous control counter (count value) |
| --- | --- | --- | --- | --- | --- |
|  | PA31 | PA21 | PA11 | PA01 |  |
| 0 | L | L | L | L | 0 |
| +1 | L | L | L | H | 1 |
| +2 | L | L | H | L | 2 |
| +3 | L | L | H | H | 3 |
| +4 | L | H | L | L | 4 |
| −4 | H | H | L | L | C |
| −3 | H | H | L | H | D |
| −2 | H | H | H | L | E |
| −1 | H | H | H | H | F |

When an incremental correction of +2 is made, the count value of the synchronous control counter 36 becomes " . . . D→E→F→2→3→ . . . " so that the counting period becomes faster by 2/16 count.

The conditions shown in the table of FIG. 14 are the same as those of FIG. 13. However, since the data setting is not performed when the output data is at IC level LOW, the conditions are 0,0. In the figure, the values 0, +2, for example, indicate the following:

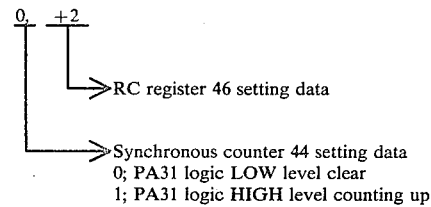

0; PA31 logic LOW level clear
1; PA31 logic HIGH level counting up

In the SYCN NOT ENTER mode (the SCRY1 signal is at logic LOW level):

(1) When the input data is shifted from the center and is within the F1 or S1 region, the synchronous counter 44 is cleared. On the other hand, when the input data is within the F0 or S0 region near the center, the synchronous counter 44 is incremented.

(2) When the input data becomes F1, F1 or F0, F1, the content of the RC register 46 is incremented by 1 from the current value. However, the maximum value must be +3. Conversely, when the input data becomes S0, S1 or S1, S1, the content of the RC register 46 is decremented by 1 from the current value. However, the minimum value must be −3.

In the SYNC ENTER mode (the SCRY1 signal is at IC HIGH level):

(1) When the input data is shifted from the center toward the FAST side and is within the F1 region two consecutive times, the synchronous counter 44 is cleared and the content of the RC register 46 is incremented by 1 from the current value.

(2) When the input data is shifted from the center toward the SLOW side and is within the S1 region two consecutive times, the synchronous counter 44 is cleared and the content of the RC register 46 is decremented by 1 from the current value.

(3) In cases other than (1) and (2) above, the synchronous counter 44 and the RC register 46 are kept unadjusted.

The timings for reading out the data from the FDDs 4 will now be described with reference to FIGS. 16A and 16B. Since the read mode signal RDMD1 obtained from the FDC12 is first at IC level LOW, the flip-flop 54 is cleared and the data input from the FDDs 4 is suppressed. The contents of the synchronous counter 44 and the RC register 46 are also cleared. When the FDC 12 starts reading out the data, the read mode signal RDMD1 becomes at IC level HIGH, and the operation of the circuit of the present invention is thus initiated. As shown in FIGS. 16A and 16B, in the FDD record format, the SYNC code of 6 bytes for the case of single density and of 12 bytes for the case of double density is added before the ID field or the data field to be read out.

When the read mode signal RDMD1 is at IC level HIGH, setting of the rotational error data in the RC register 46 and the incrementing of the synchronous counter 44 are performed while the SYNC code data is being input to set the SYNC ENTER mode. After the synchronization is established, the input and output of the data of the ID field or the data field is performed. When the reading out of the ID field or the data field is completed, the FDDs set the read mode signal RDMD1 at IC level LOW. When the read mode signal RDMD1 is at IC level LOW, the synchronous counter 44 and the RC register 46 are cleared to inhibit the input of data.

Thus, they are prepared for reading out of the data corresponding to the next SYNC code.

The present invention has been described with reference to the embodiment wherein an input data synchronizing circuit of the present invention is applied as a VFO in the floppy disk interface. However, a case will now be described briefly wherein the present invention is applied to a received data synchronizing circuit of a communications interface.

In the case of a received data synchronizing circuit unlike the case of the floppy disk drive, the input data consists of signals of HIGH or LOW level. Thus, received clock signals RDCK1 (same as CT31) synchronous with the input data are generated by the input data synchronizing circuit of the present invention, and the input data is sampled at the leading edges of these signals. This is shown in FIGS. 17A to 17C wherein the received clock signals RDCK1 are synchronized (the trailing edges are the center of the input data) according to the input data. The output data WINDOW signals are not used in this embodiment.

What we claim is:

1. An input data synchronizing circuit comprising:
   (A) a clock generator;
   (B) synchronous control counting means for receiving an initial value, for counting every time a clock signal is supplied from said clock generator, for outputting control signals related to at least a part of said count and representing phase status during current data input and phase status during preceding data input, and for outputting WINDOW signals synchronous with input data;
   (C) at least one register for holding control signals, said register being set with said control signals both at a time when said data is input and at a time when immediately preceding data is input;
   (D) read-only memory means, addressed at least in part with said control signals from said register, for outputting correction values as initial values for said synchronous control counting means so that said synchronous control counting means outputs said WINDOW signal in synchronism with said input data at nearly the center of a pulse width of said window signal, said initial values being supplied by said read-only memory means to said synchronous control counting means which outputs said control signals to said register; and
   (E) synchronous counting means for detecting achievement of synchronization by counting the number of times said input data is near the center of said WINDOW signal, and when said number of times reaches a predetermined number, providing an indication to address, in part, said read-only memory means so that appropriate ones of said correction values are applied to said synchronous control counting means both before and after said achievement of synchronization.

2. An input data synchronizing circuit for floppy disk drives comprising:
   (A) synchronous control counting means for receiving an initial value, for counting in a predetermined manner every time a clock signal is supplied thereto, for outputting control signals related to at least a part of said count and representing a phase status during input of current data and a phase status during input of immediately preceding data, and for outputting WINDOW signals synchronous with said input data;
   (B) at least one first register for holding said control signals representing said phase status during input of said current data and said phase status during input of said immediately preceding data;
   (C) converting means for receiving said control signals from said first register and for outputting correction values as said initial values for said synchronous control counting means, said converting means supplying said initial values to said synchronous control counting means;
   (D) a second register which holds control signals representing stationary time shift information supplied from said converting means and serially generated by rotational errors of said floppy disk drives and which feeds back said control signals to said converting means;
   (E) a clock generator for supplying clock signals to said synchronous control counting means, said converting means, and said first and second registers; and
   (F) synchronous counting means for detecting achievement of synchronization counting means for detecting achievement of synchronization by counting the number of times said input data is near the center of said WINDOW signal, and when said number of times reaches a predetermined number, providing an indication to said converting means so that appropriate ones of said correction values are applied to said synchronous control counting means before and after said achievement of synchronization.

3. An input data synchronizing circuit for floppy disk drives according to claim 2, wherein said converting means comprises a read-only memory which stores said correction values and which is accessed at an address including in part said control signals output from said first and second registers.

4. An input data synchronizing circuit for floppy disk drives according to claim 2, wherein said clock generator outputs clock signals of different frequencies depending upon whether the density of a medium of said floppy disk drives is single or double density and depending upon a type of said medium.

* * * * *